United States Patent
Kobayashi

(10) Patent No.: US 7,170,687 B2
(45) Date of Patent: Jan. 30, 2007

(54) PROJECTION LENS SYSTEM AND PROJECTOR

(75) Inventor: Kiwamu Kobayashi, Fujimi-machi (JP)

(73) Assignee: Nittoh Kogaku K.K. (JP)

( * ) Notice: Subject to any disclaimer, the term of this patent is extended or adjusted under 35 U.S.C. 154(b) by 0 days.

(21) Appl. No.: 11/131,954

(22) Filed: May 18, 2005

(65) Prior Publication Data

US 2005/0259336 A1    Nov. 24, 2005

(30) Foreign Application Priority Data

May 19, 2004    (JP)    ............... 2004-148947

(51) Int. Cl.
  *G02B 9/00*    (2006.01)
  *G02B 17/00*    (2006.01)
(52) U.S. Cl. ...................... 359/651; 359/736
(58) Field of Classification Search ................ 359/650, 359/651, 734–736, 795
  See application file for complete search history.

(56) References Cited

U.S. PATENT DOCUMENTS

2004/0027497 A1*    2/2004    Jeon et al. .................. 348/779

FOREIGN PATENT DOCUMENTS

| JP | 09-218379 | 8/1997 |
| JP | 2001-042211 | 2/2001 |

* cited by examiner

*Primary Examiner*—Ricky Mack
*Assistant Examiner*—William Choi
(74) *Attorney, Agent, or Firm*—Thompson Hine LLP

(57) ABSTRACT

A projection lens system of the present invention projects projection light from a light modulator onto a screen and includes a first lens group disposed closest to the screen, the first lens group including a first meniscus lens with negative refractive power that is positioned closest to the screen and is convex on a screen side, a cemented lens that is positioned on a light modulator side, and a means for bending an optical path between the first meniscus lens and the cemented lens. The means for bending the optical path is disposed between the negative meniscus lens and the cemented lens of the first lens group. Since the cemented lens of the first lens group is disposed in line with the lenses in the second lens group, the lens system of this invention is produced with a slim overall construction even if the cemented lens is in the first lens group.

6 Claims, 4 Drawing Sheets

PROJECTION LENS SYSTEM AND PROJECTOR

BACKGROUND OF THE INVENTION

1. Field of the Invention

The present invention relates to a projection lens system of a projector that enlarges and projects an image displayed on a light valve, such as a liquid crystal panel or a DMD, onto a screen.

2. Description of the Related Art

Rear-projection-type devices are known as image display apparatuses with large screen sizes and slim bodies. It is disclosed in Japanese Laid-Open Patent Publication No. 2001-42211 and in Japanese Laid-Open Patent Publication No. H09-218379 that the height and depth of a projector can be reduced by disposing a prism for bending the optical path at an intermediate position behind a closest lens group to the screen in a lens system so that the optical path is bent by 90° or thereabouts.

When a liquid crystal panel is used as the light valve (light modulator), and in particular when an LCOS (Liquid Crystal on Silicon) panel (i.e., a reflective liquid crystal panel) or a DMD (digital mirror device) is used as the light modulator, the lens system that forms the optical system for projecting the image formed on the light modulator onto the screen needs to have a long back focus. As one example of a wide-angle lens that has a long back focus, there is a retrofocus-type lens in which a first lens group with negative refractive power and a second lens group with positive refractive power are disposed in that order from the screen side. In this type of lens system, it is easy to make the incident side telecentric, so that it is possible to prevent color shading due to color separation in the light modulator and angular dependence of the spectroscopic characteristics of the combining means. However, retrofocus-type lens systems are normally highly asymmetric, which makes it difficult to reduce distortion. Correction of distortion can be facilitated by disposing a positive lens on the screen side of the lens system, but to achieve a lens system that has a wide angle relative to the lens diameter, it is preferable to use a meniscus lens, which is convex on the screen side and has negative refractive power, closest to the screen.

By disposing a cemented lens on a light modulator side of a first lens group and a cemented lens on the screen side of a second lens group respectively, the symmetry of the lens arrangement can be improved, and various kinds of aberration, in particular chromatic aberration, can be favorably corrected. However, cemented lenses are combinations of a positive lens and a negative lens, and so tend to be thick, which increases the length of the first lens group positioned on the screen side. Accordingly, even if the optical path is bent by disposing a prism between the first lens group and the second lens group as shown in the Japanese Laid-Open Patent Publication No. 2001-42211, the part of the bent optical path on the screen side, that is, the first lens group, will still be thick. Accordingly, such lens system is not suited to being enclosed inside a compact, slim rear projector.

It is an object of the present invention to provide a lens system that can have a slim, compact overall construction and in which various kinds of aberration can be favorably corrected, making the lens system suited to a rear projector.

SUMMARY OF THE INVENTION

A projection lens system according to the present invention projects projection light from a light modulator onto a screen and includes a first lens group disposed closest to the screen, the first lens group including a first meniscus lens with negative refractive power that is positioned closest to the screen and is convex on a screen side, a cemented lens that is positioned on a light modulator side, and a means for bending an optical path between the first meniscus lens and the cemented lens. Instead of providing a means for bending the optical path composed of a mirror or a prism between the first lens group and another lens group, a means for bending the optical path is disposed between the lenses that compose the first lens group, that is, between the negative meniscus lens and the cemented lens of the first lens group. According to the arrangement of the invention, the cemented lens of the first lens group is disposed in a line with the lenses in the other lens group and the lenses of the screen side of the first lens group are disposed in a direction that is bent with respect to the lenses in the other lens group. The lens system of this invention can be produced with a slim overall construction even if the cemented lens (balsam lens) that is produced by cementing a negative lens and a positive lens is disposed in the first lens group.

When the first lens group includes, in order from the screen side, the first meniscus lens, a second meniscus lens that has negative refractive power and is convex on the screen side, a biconcave negative lens, and the cemented lens that has positive refractive power, the means for bending the optical path can be disposed between the biconcave negative lens and the cemented lens.

It is preferable for the first lens group to have an overall negative refractive power, for a second lens group with positive refractive power to be disposed on the light modulator side of the first lens group, and for a cemented lens to be disposed on a screen side of the second lens group. Applying such an arrangement, it is possible to provide a projection lens system that is an overall retrofocus-type lens system, is highly symmetrical in that cemented lenses are disposed on the light modulator side of the first lens group and the screen side of the second lens group, respectively, and where the part of the first lens group bent toward the front is slim. It is possible to provide a projection lens system that has a long back focus and is telecentric on the incident side, with the overall system being thin and various kinds of aberration being favorably corrected. In addition, by including at least three cemented lenses, that is at least two sets of cemented lens in addition to the cemented lens positioned closest to the screen in the second lens group that has positive refractive power, it is possible to provide a bright projection lens system where the chromatic difference of magnification is favorably corrected and a peripheral brightness ratio of 75% or higher is achieved in spite of the lens system being wide-angle.

Accordingly, a projector including a projection lens system according to the present invention and a light modulator is slim, compact, and can display images on a large screen, and is therefore suited to a rear-projection-type image display apparatus.

As explained, by disposing a means for bending an optical path, such as a mirror or a prism, between the lenses of the first lens group (the closest group to the screen in a projection lens system) and in particular, by disposing the means on a screen side of a cemented lens (balsam lens), it is possible to reduce the number of lenses in front of (i.e., on the screen side) of the bend so that the lens system can be made slim, even if a cemented lens is used in the first lens group. Accordingly, it is possible to provide a projection lens system that has a slim overall construction and in which aberration is favorably corrected.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENT(S)

Figure 1:
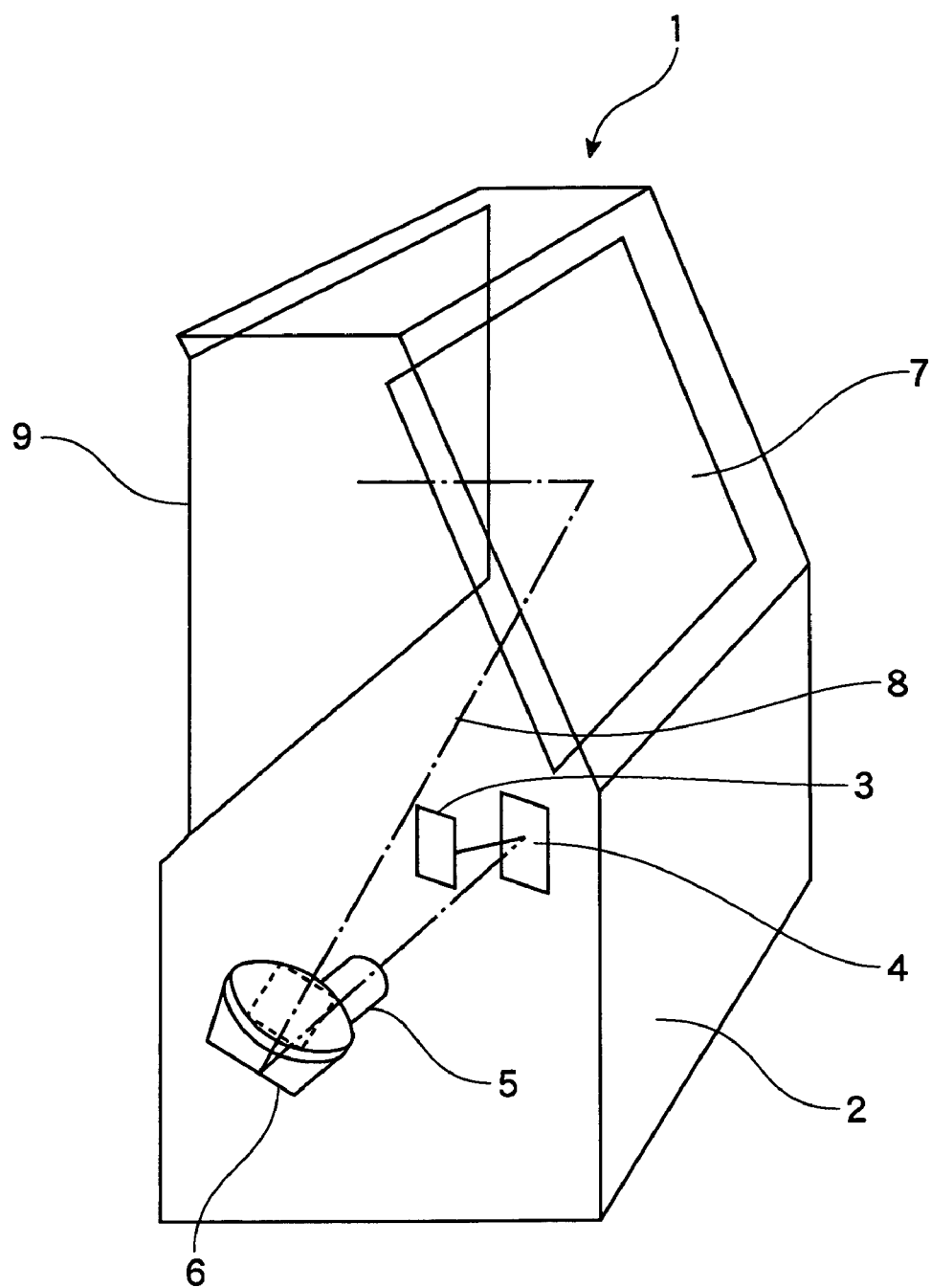
FIG. 1 is a diagram schematically showing the construction of a rear projector.

FIG. 1 shows the construction of a rear projector 1 equipped with a projection lens system according to the present invention. The rear projector 1 includes, inside a housing 2, a light source 3, a light modulator (light valve) 4 that modulates light from the light source 3 according to an image signal to form an image, a projection lens system 5 that projects projection light 8 from the light valve 4 onto a screen 9 from the rear surface side, and a mirror 7 that reflects and guides the projection light 8 to the screen 9. A liquid crystal panel is often used as the light valve 4, but it is also possible to use a DMD panel composed of micromirror elements. When a DMD panel or an LCOS (reflective liquid crystal) panel is used, the light valve 4 is reflective, and accordingly the light source 3 is disposed on the same side of the light valve 4 as the projection lens system 5. It is therefore necessary to use a lens system with a long back focus as the projection lens system 5. In addition, when a liquid crystal panel or a DMD panel is used as the light valve 4, it is necessary to make the input or incident side of the projection lens system 5 telecentric.

The projection lens system 5 of the present embodiment internally includes a mirror 6 that bends the optical path so that light is bent inside the projection lens system 5 and the projection light is guided toward the mirror 7 disposed before the screen.

Figure 2:
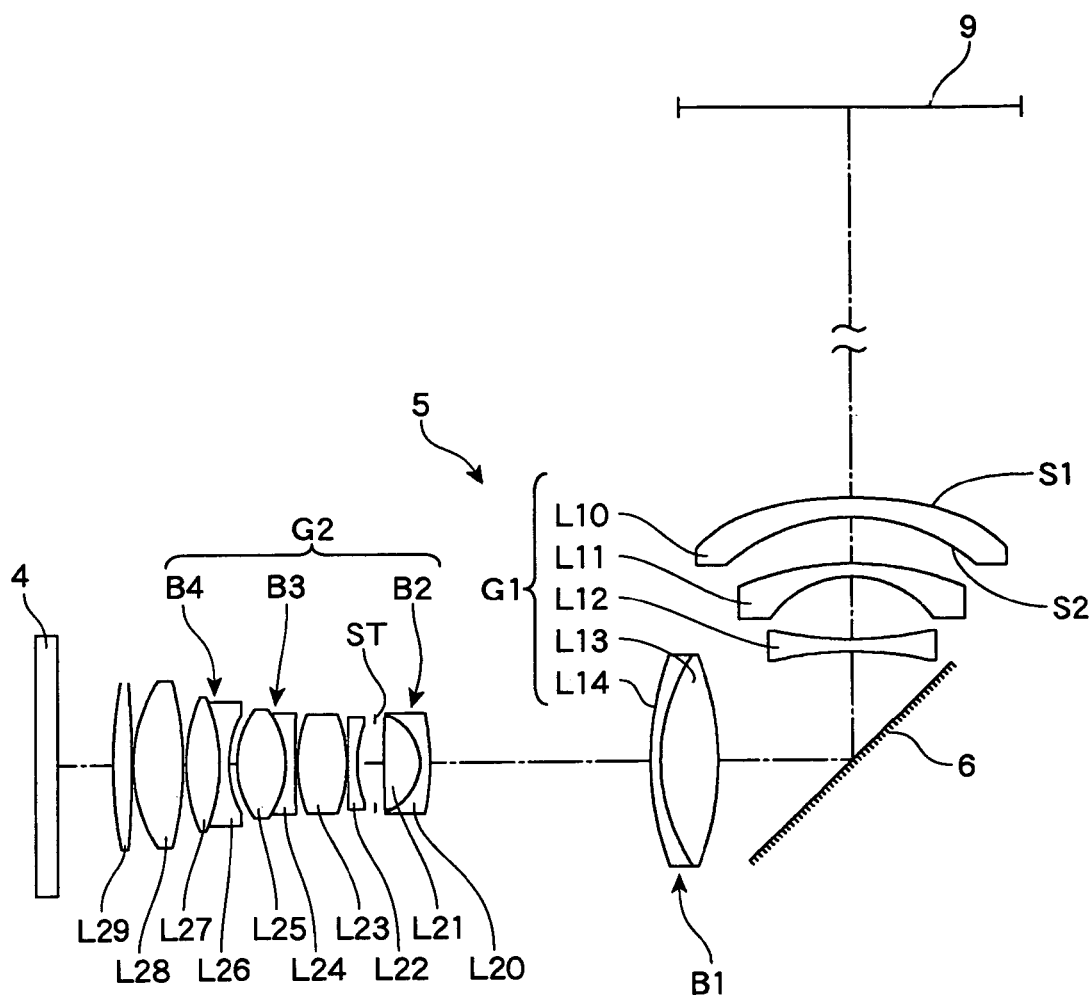
FIG. 2 is a diagram showing the construction of a projection lens system according to the present invention.

FIG. 2 shows the lens arrangement of the projection lens system 5. In the projection lens system 5 of the present embodiment, a total of fifteen lenses numbered L10 to L14 and L20 to L29 are disposed from the side of the screen 9 (output side) to the side of the light valve 4 (input side or incident side). These lenses L10 to L14 and L20 to L29 can be divided into a first lens group G1 that is disposed on the side of the screen 9 and has a negative overall refractive power and a second group G2 that is disposed on the side of the light valve 4 and has a positive overall refractive power. The mirror 6 for bending the optical path is disposed within the first lens group G1.

The first lens group G1 is composed of five lenses that in order from the side of the screen 9 are negative meniscus lenses L10 and L11 that are convex on the screen side, a bi-concave negative lens L12, a biconvex lens L13, and a negative meniscus lens L14 that is convex on the side of the light valve 4. The biconvex lens L13 and the negative meniscus lens L14 form a cemented lens (balsam lens) B1, with the mirror 6 for bending the optical path being disposed on the screen side of this cemented lens B1. In addition, both surfaces S1 and S2 of the first meniscus lens L10 are aspherical.

The second group G2 is composed of a total of ten lenses that in order from the side of the screen 9 are a negative meniscus lens L20 that is convex on the screen side and a positive meniscus lens L21 that is convex on the screen side, these lenses L20 and L21 composing a cemented lens B2, a negative meniscus lens L22 that is concave on the screen side, a bi-convex positive lens L23, a negative meniscus lens L24 that is convex on the screen side and a bi-convex positive lens L25, these lenses L24 and L25 composing a cemented lens B3, a bi-concave negative lens L26 and a bi-convex positive lens L27 that compose a cemented lens B4, and bi-convex positive lenses L28 and L29. A stop (aperture) ST is disposed between the cemented lens B2 and the negative meniscus lens L22.

The projection lens system 5 is a retrofocus-type lens system where lens groups with negative and positive power are disposed in that order from the screen side, is telecentric on the side of the light valve 4, and is therefore suited to use in a projector where the light valve 4 is a liquid crystal panel or a DMD.

In the lens data shown below, "No." represents the number of the lens surface counting in order from the side of the screen 9, "Rdy" represents the radius of curvature (mm) of each lens surface, "Typ" shows whether the lens surface type is aspherical ("ASP") or spherical ("SPH"), "Thi" represents the distance (mm) between the respective lens surfaces, "nd" represents the refractive index (d line) of each lens, and "vd" represents the Abbe number (d line) of each lens. Also, the expression "INFINITY" indicates a flat surface.

| No. | Rdy | Typ | Thi | nd | vd | |
|---|---|---|---|---|---|---|
| 1 | 89.754 | ASP | 4.0000 | 1.49180 | 57.21 | lens L10 |
| 2 | 36.235 | ASP | 9.6600 | | | |
| 3 | 58.034 | SPH | 2.7000 | 1.74330 | 49.22 | lens L11 |
| 4 | 20.087 | SPH | 13.1400 | | | |
| 5 | −70.371 | SPH | 2.6000 | 1.77250 | 49.62 | lens L12 |
| 6 | 70.371 | SPH | 50.0700 | | | |
| 7 | 63.103 | SPH | 11.8000 | 1.58144 | 40.89 | lens L13 |
| 8 | −40.634 | SPH | 2.0000 | 1.84666 | 23.78 | lens L14 |
| 9 | −66.344 | SPH | 45.0000 | | | |
| 10 | 54.734 | SPH | 2.0000 | 1.77250 | 49.62 | lens L20 |
| 11 | 11.099 | SPH | 7.2000 | 1.68893 | 31.16 | lens L21 |
| 12 | −1062.440 | SPH | 1.8600 | | | |
| 13 | INFINITY | STO | 3.4600 | | | stop ST |
| 14 | −24.593 | SPH | 1.9000 | 1.77250 | 49.62 | lens L22 |
| 15 | 1658.092 | SPH | 0.3300 | | | |
| 16 | 29.273 | SPH | 10.0000 | 1.51680 | 64.20 | lens L23 |
| 17 | −29.273 | SPH | 0.4000 | | | |
| 18 | −1663.344 | SPH | 2.0000 | 1.90367 | 31.32 | lens L24 |
| 19 | 20.007 | SPH | 9.8500 | 1.51680 | 64.20 | lens L25 |
| 20 | −20.007 | SPH | 1.7900 | | | |
| 21 | −21.042 | SPH | 2.0000 | 1.90367 | 31.32 | lens L26 |
| 22 | 35.642 | SPH | 7.0000 | 1.48749 | 70.44 | lens L27 |
| 23 | −35.642 | SPH | 0.6800 | | | |
| 24 | 71.887 | SPH | 10.0000 | 1.48749 | 70.44 | lens L28 |
| 25 | −33.486 | SPH | 0.3200 | | | |
| 26 | 225.779 | SPH | 3.8000 | 1.84666 | 23.78 | lens L29 |
| 27 | −96.985 | SPH | 4.0000 | | | |

The first meniscus lens L10 that is positioned closest to the screen is made of plastic and both the first surface (S1) and the second surface (S2) thereof are aspherical. The aspherical coefficients of these surfaces are as follows.

The first surface (S1)

$R=89.754, K=0.0000$ $A=5.1415\times10^{-6}, B=-6.5371\times10^{-9}$ $C=1.0133\times10^{-11}, D=-4.0522\times10^{-15}$ The aspherical surfaces are expressed by the following Expression (1) using the coefficients K, A, B, C, and D given above with X as the coordinate in the optical axis direction, Y as the coordinate in a direction perpendicular to the optical axis, the direction in which light propagates as positive, and R as the paraxial radius of curvature. This is also the case hereinafter.

$$X=(1/R)Y^2/[1+\{1-(1+K)(1/R)^2Y^2\}^{1/2}]+AY^4+BY^6+CY^8+DY^{10} \quad (1)$$

The second surface (S2)

Figure 3:
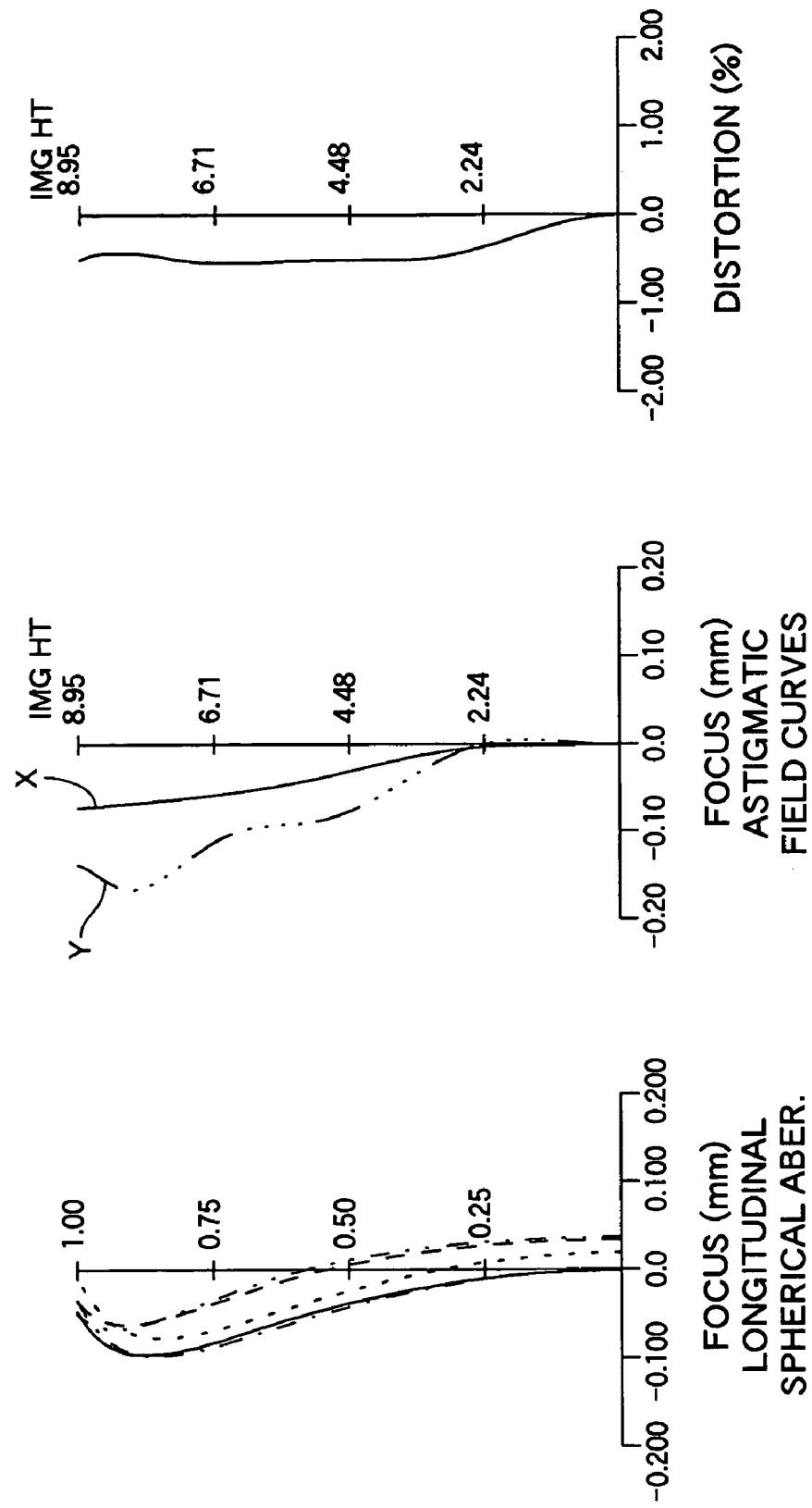
FIG. 3 is a series of graphs showing longitudinal aberration of the lens system shown in FIG. 2.
Figure 4:
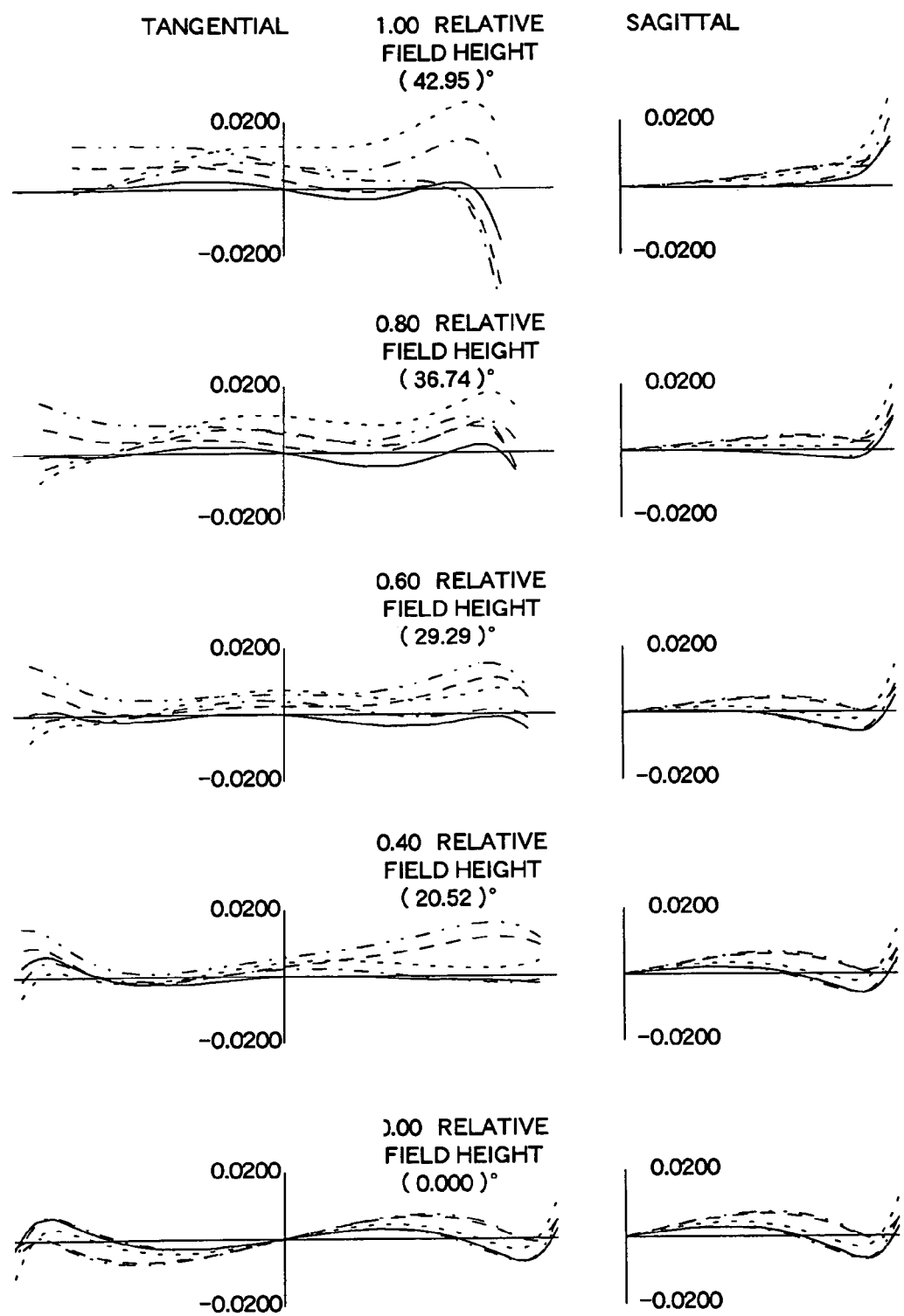
FIG. 4 is a series of graphs showing lateral aberration of the lens system shown in FIG. 2.

$R=36.235, K=0.0000$ $A=1.5428\times10^{-6}, B=-2.1442\times10^{-8}$ $C=4.6763\times10^{-11}, D=-3.1591\times10^{-14}$ FIG. 3 shows the spherical aberration (longitudinal aberration), astigmatism, and distortion of the projection lens system 5. FIG. 4 shows the spherical aberration (lateral aberration) of the projection lens system 5. Values of the spherical aberration are given for the respective wavelengths 670 nm (dotted line), 630 nm (dot-dash line), 550 nm (solid line), 465 nm (dash line), and 440 nm (dot-dot-dash line). As shown in the drawings, the longitudinal aberration of the lens system 5 of the present embodiment is kept within a range of around ±0.1 mm and the lateral aberration is kept within a range of around ±0.02 mm. The distortion is kept within a range of around 0.05% or below. Since both surfaces of the meniscus lens L10 closest to the screen are aspherical, the lens system 5 can effectively correct distortion and curvature of field that are the drawbacks with retrofocus-type lens systems, and since three or more balsam lenses B2 to B4 are included in the second lens G2, it is possible to favorably correct the chromatic difference of magnification. In addition, in spite of being a wide-angle lens, the projection lens system 5 can maintain a high peripheral brightness ratio of 75% or higher.

The values of the various aberrations given above are far superior to the values of the various aberrations of the projection lens system disclosed in Japanese Laid-Open Patent Publication No. 2001-42211 that also has a means for bending the optical path and a second lens group including three cemented lenses. From the projection lens system 5 according to the present invention, it can be understood that by disposing the cemented lens B1 on the side of the light valve 4 of the first lens group G1, a lens system with improved symmetry with respect to the second group G2 and far superior image forming performance is obtained.

In addition, by inserting the mirror 6, which bends the optical path, at the screen side of the cemented lens B1 in the first lens group G1, it is possible to prevent an increase in the thickness of the screen side part of the first lens group G1 even when the first lens group G1 includes the cemented lens B1. This means that it is possible to provide a telecentric lens system on the incident side that favorably corrects various kinds of aberration and is thinner. Disposing the balsam lens B1 with positive power immediately after the mirror 6 that is on the side of the second lens group G2 of the first lens group G1, has a further merit in that the radii of the lenses in the second lens group can be reduced.

It should be noted that although the mirror 6 is used as a means for bending the optical path in the lens system described above, a prism can be used instead.

What is claimed is:

1. A projection lens system that projects projection light from a light modulator side onto to a screen side, comprising:

a first lens group disposed closest to the screen side, the first lens group including a first meniscus lens with negative refractive power that is positioned closest to the screen side and is convex on the screen side, a cemented lens that is positioned on the light modulator side, and a means for bending an optical path between the first meniscus lens and the cemented lens, the first lens group having an overall negative refractive power; and a second lens group with positive refractive power that is disposed on the light modulator side of the first lens group, the second lens group including a cemented lens that is closest to the screen side and at least two sets of cemented lens in addition to the cemented lens positioned closest to the screen side.

2. The projection lens system according to claim 1, wherein the first lens group includes, in order from the screen side, the first meniscus lens, a second meniscus lens that has negative refractive power and is convex on the screen side, a biconcave negative lens, and the cemented lens that has positive refractive power, the means for bending the optical path being disposed between the biconcave negative lens and the cemented lens.

3. A projector, comprising:
a projection lens system according to claim 1; and
a light modulator.

4. A projection lens system that projects projection light from a light modulator side to a screen side, comprising:

a first lens group disposed closest to the screen side, the first lens group consisting of, in order from the screen side, a first meniscus lens with negative refractive power that is convex on the screen side, a second meniscus lens with negative refractive power that is convex on the screen side, a biconcave negative lens, and a cemented lens with positive refractive power; and a means for bending the optical path being disposed between the biconcave negative lens and the cemented lens.

5. The projection lens system according to claim 4, wherein the first lens group has an overall negative refractive power and the projection lens system further comprises a second lens group with positive refractive power that is disposed on the light modulator side of the first lens group.

6. A projector, comprising:
a projection lens system according to claim 4;
a screen; and
a light modulator.

* * * * *

UNITED STATES PATENT AND TRADEMARK OFFICE
CERTIFICATE OF CORRECTION

PATENT NO.         : 7,170,687 B2                                                Page 1 of 1
APPLICATION NO. : 11/131954
DATED              : January 30, 2007
INVENTOR(S)        : Kiwamu Kobayashi It is certified that error appears in the above-identified patent and that said Letters Patent is hereby corrected as shown below:

Claims

Col. 6, Line 8 Claim 1 – After "side" delete "onto".

Signed and Sealed this

Fourth Day of September, 2007

JON W. DUDAS
*Director of the United States Patent and Trademark Office*